Nov. 4, 1969  A. O. DE HART ET AL  3,475,826
IN PROCESS GAUGE
Filed Oct. 20, 1966  3 Sheets-Sheet 1
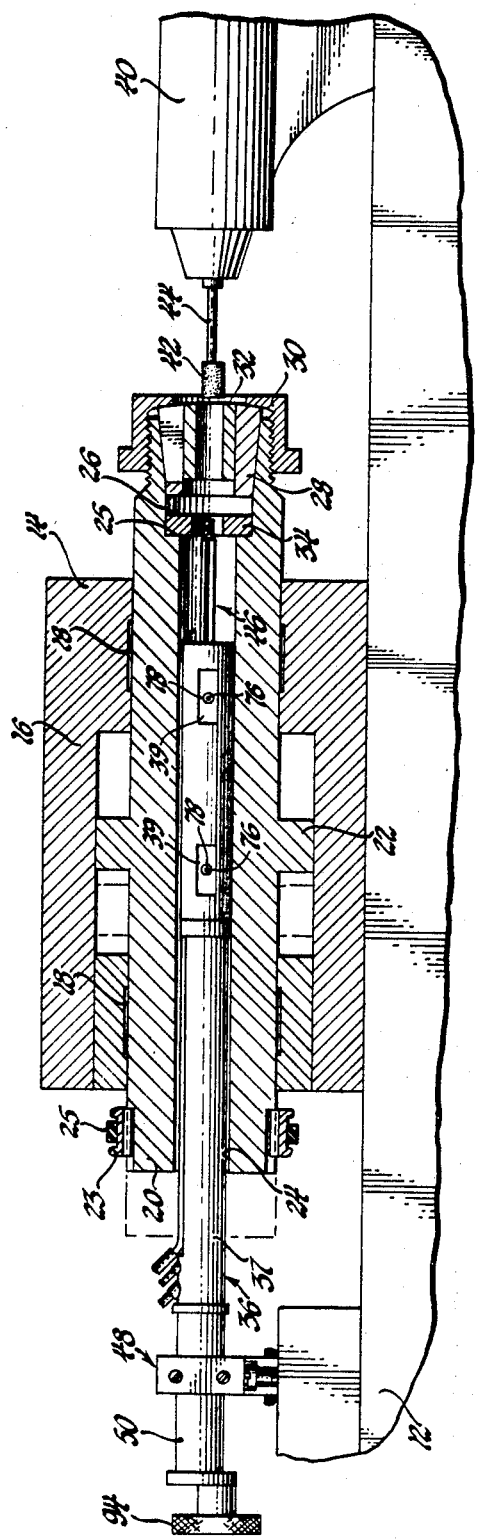
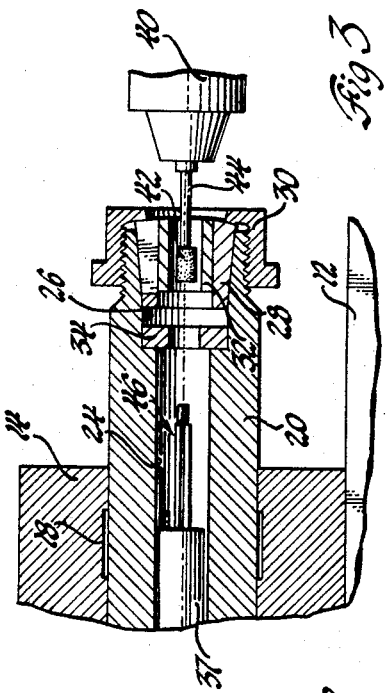
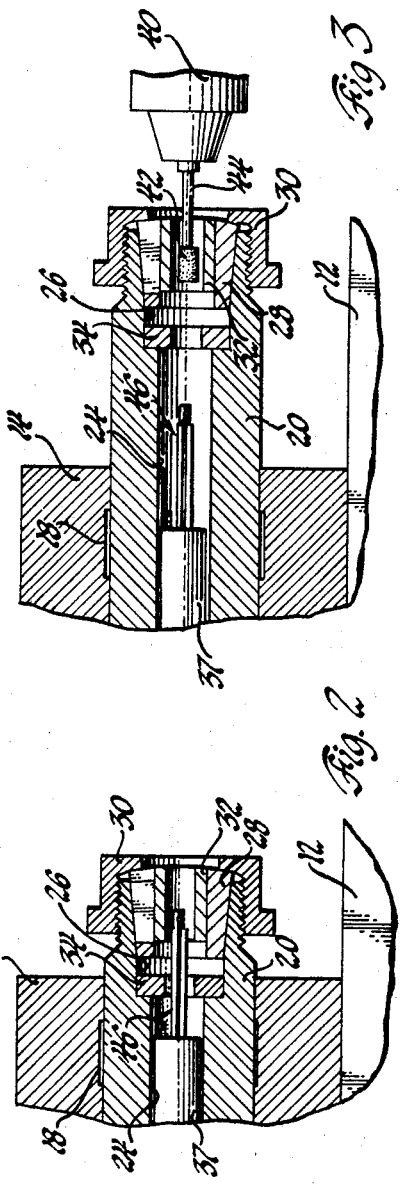
INVENTORS
Robert G. Lenz,
Arnold O. DeHart,
BY & Harold W. Farchland
F. J. Fodale
ATTORNEY

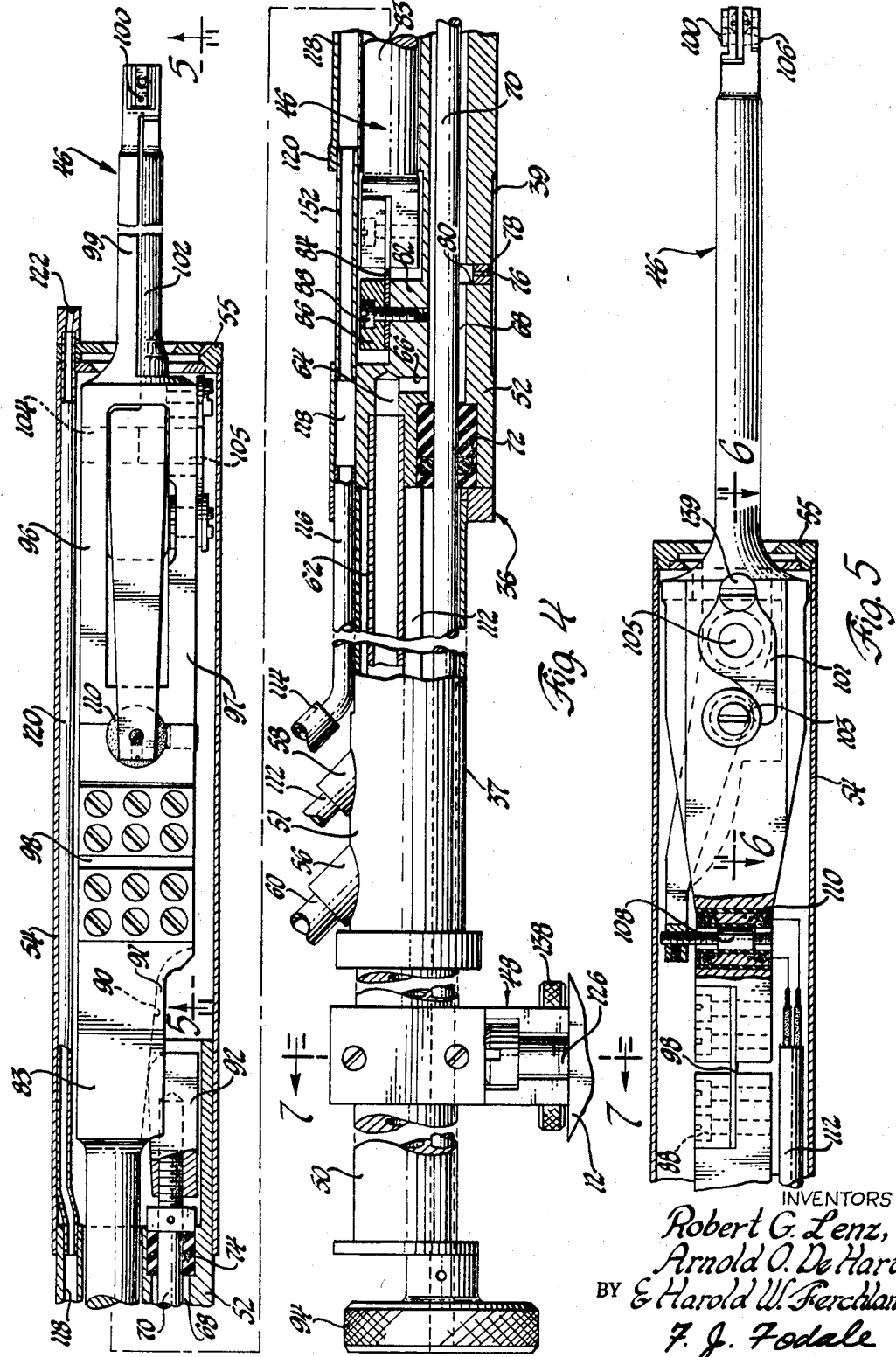

United States Patent Office 3,475,826
Patented Nov. 4, 1969

3,475,826
IN PROCESS GAUGE
Arnold O. De Hart, Rochester, Harold W. Ferchland, Troy, and Robert G. Lenz, Detroit, Mich., assignors to General Motors Corporation, Detroit, Mich., a corporation of Delaware
Filed Oct. 20, 1966, Ser. No. 588,038
Int. Cl. B23f 23/08; B23q 17/04
U.S. Cl. 33—174
1 Claim

ABSTRACT OF THE DISCLOSURE

An elongated cylindrical gauge with an expandable scissors-like probe is nonrotatably secured to the support of an internal grinder and extends into the bore of a hollow spindle. The spindle is rotatable and translatable and has a calibration ring mounted inboard of a chuck which holds the workpiece at one end. The gauge and its probe are dimensioned and positioned so that the probe traverses and measures the calibration ring and the workpiece as the spindle is retracted from its working to its nonworking position.

---

Our invention relates generally to gauging apparatus and more particularly to gauging apparatus especially suitable for but not limited to use with a machine tool having a translating type spindle for the in-process gauging of a bore or hole in the part which is being machined and to a machine tool so equipped.

In the machining of precision parts, it is often necessary to measure the part several times in order to determine when the part has been machined to its finished dimensions. With the gauges now available, this necessitates shutting down the machine in order to perform the gauging operation which becomes tedious and time consuming. Also the available gauges provide no convenient way of measuring the taper of the bore or showing any irregularities in its axial profile. Accordingly, the object of our invention in its broadest aspect is to provide a gauge which can measure and explore a machined part while it is in the machine in which it is being processed.

Another object of our invention is to provide such a gauge which is accurately centered on the part at all times.

Another object of our invention is to provide a gauge adapted to be accurately centered in the bore of a translating type work spindle so that the gauge is able to measure the part while it is in the machine in which it is being processed.

Another object of our invention is to provide such a gauge which can measure the diameter of a bore or hole in a part while it is in the machine in which it is being processed and which can give an axial profile of the bore so as to indicate taper or other deviation from a true axial bore.

Another object of our invention is to provide a gauge antifrictionally supported and centered in a translating work spindle and mounted on the machine so that the gauge can traverse the part being machined and a calibration ring to compare the diameters of the part and the calibration ring.

Another object is to provide a gauge adapted to be antifrictionally supported and centered in a translating work spindle so that the gauge can traverse a bore or hole in a part being machined and a calibration ring to secure an axial plot of the bore and the calibration ring diameters.

Other objects and advantages of the invention will hereinafter become more fully apparent from the following description of the annexed drawings, which illustrate a preferred embodiment, and wherein:

FIGURE 1 is a schematic taken on the longitudinal axis of a machine tool provided with a gauge in accordance with our invention showing the relationship of the gauge and the tool spindle when a calibration ring is being gauged.

FIGURE 2 is a portion of FIGURE 1 showing the relationship of the gauge and the tool spindle when the workpiece is being gauged.

FIGURE 3 is a portion of FIGURE 1 showing the relationship of the gauge and the tool spindle when the workpiece is being ground.

FIGURE 4 is a view of the gauge probe shown in greater detail.

FIGURE 5 is a view taken along the line 5—5 of FIGURE 4 and looking in the direction of the arrows.

Figure 6:
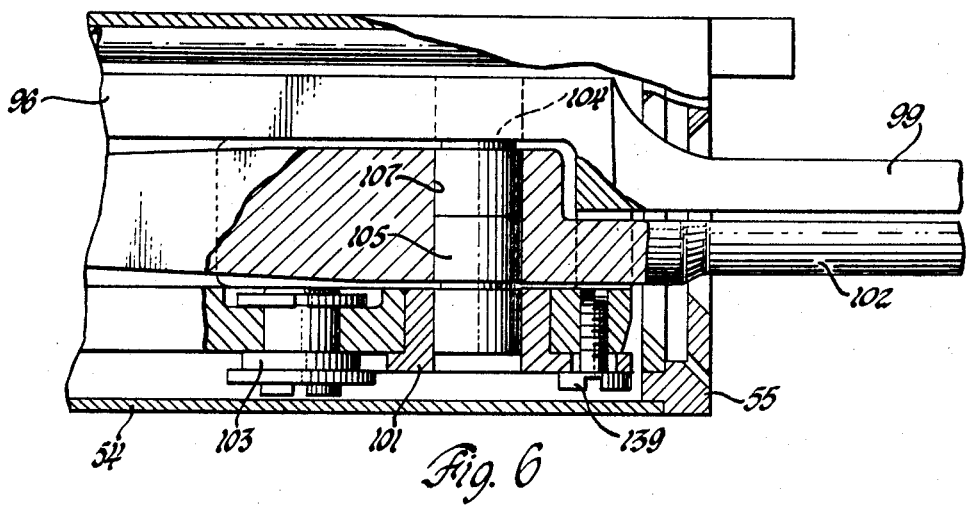
FIGURE 6 is a view taken along the line 6—6 of FIGURE 5 and looking in the direction of the arrows.

Referring now to the drawings and more particularly to FIGURES 1, 2, and 3, we have shown an internal diameter grinder comprising a support or bed 12 upon which is mounted a spindle housing 14. The spindle housing 14 includes an hydraulic cylinder 16 straddled by a pair of hydrostatic fluid bearings 18. A spindle 20 is disposed in the bore of the housing 14 and antifrictionally supported therein by the hydrostatic bearings 18. Spindle 20 includes an integral piston 22 slidable within the cylinder 16. The spindle is thus adapted to be both rotated and translated—the hydrostatic bearings being capable of supporting the spindle for both types of movement. The rotation of the spindle may be accomplished by any suitable means such as a fixed pulley 23 which is splined to the spindle 20 and driven by an electric motor (not shown) through belt 25, so that the spindle 20 is translatable with respect to the pulley 23. Translation of the spindle 20 is accomplished by suitable control of the pressure applied to the opposite sides of the piston 22 in the cylinder 16.

The spindle 20 has a central bore 24 which opens into an enlarged cavity 26 at its right end as viewed in the drawings. A chuck 28 is located in the cavity 26 and cooperates with an end cap 30 threadably mounted on the outer circumference of the spindle 20 to mount a workpiece 32. A calibration gauge ring 34 is frictionally mounted in the cavity 26 behind the chuck 28 and against the shoulder 25 between the bore 24 and the larger diameter cavity 26.

Disposed in the smaller bore 24 is a gauge 36 comprising an elongated body 37 and a scissors type probe 46. The left end of the gauge body 37 extends out of the bore and is fixedly secured to the support 12 by a mount 48. The midportion of the gauge body 37 has two axially spaced circumferential sets of pads 39 machined into its circumference. A pressurized fluid supplied to these pads forms a fluid bearing for antifrictionally supporting and centering the gauge in the spindle bore as will hereinafter be more fully explained.

A motor 40 mounted on the support 12 at its right end drives a grinding wheel 42 through a shaft 44.

Briefly, the operation of the device is as follows. During operation, the grinding wheel 42 and spindle 20 are preferably rotated in opposite directions with the grinding wheel 42 being in contact with the inner surface of the workpiece 32 to remove material therefrom. In some applications, it may be desirable to rotate the grinding wheel and workpiece in the same direction or to rotate the grinding wheel only while holding the workpiece stationary. In the latter case, the spindle 20 would not have to be rotatable. In many instances, it is desirable to check the dimensions of the workpiece being ground with a minimum of elapsed time so that more production time may be utilized for the actual grinding. To accomplish this end, we have provided our gauging device which allows in process gauging of the workpiece 32. This feature is accomplished generally by fixing the gauge 36 and translating the spindle 20.

Referring momentarily to FIGURE 3, the parts of the gauge are shown with the grinding wheel in its working position wherein material is ground off the inner diameter of the workpiece. When it is desired to gauge the part, fluid under pressure is admitted to the cylinder 16 on the right side of the piston 22 through suitable control means (not shown) which causes the spindle to translate to the left from the position shown in FIGURE 3 to the position shown in FIGURE 1. In the position shown in FIGURE 1, the styli at the end of the expandable scissors probe 46 contact the inner walls of the gauging ring 34 and measure its diameter. As the spindle 20 moves further to the left to the position in FIGURE 2, the probe 46 measures the internal diameter of the workpiece 32. During this movement, the styli have measured the diameter of the calibration ring 34 and the diameter of the bore of workpiece 32 in succession thus giving a comparison type reading. The styli have also transversed the workpiece bore to give an axial profile of the bore, if desired. The comparison type reading shows the dimension and axial profile of the workpiece bore with respect to the calibration ring. Now that a basic description of our device has been given, we will describe the details of construction of the gauge 36 itself.

Referring now to FIGURE 4, it is seen that the guage body 37 is made up of a number of subsections. Starting at the left-hand end of FIGURE 4, the gauge body 37 comprises two tubular shells 50 and 51, respectively. Shell 50 is of smaller diameter, extends through and is fixedly secured to the mount 48 which will be explained in detail later. Progressing toward the right, in the lower portion of FIGURE 4, the next element of the body 37 comprises a machined element 52 having various passages and cavities. Part of element 52 lies in the upper portion of FIGURE 4 where it is seen that a third cylindrical shell 54 mounted on the end of the element 52 and an end plate 55 complete the body 37.

Returning to shell 51, it is seen to include two bosses 56 and 58. Boss 56 receives a conduit 60 which supplies pressurized fluid. A conduit 62 disposed within shell 51 connects the conduit 60 with a passage 64 in the element 52. A transverse passage 66 connects the passage 64 with a second elongated passage 68 which extends for nearly the entire length of the element 52. The passage 68 contains an adjustment rod 70, the function of which will be explained later. Seals 72 and 74 are provided at both ends of the passage 68. One of the air bearing pads 39 is shown in the drawing. This pad is representative of a number of circumferentially spaced pads on the element 52. There is a second set of circumferentially spaced pads, however, they do not show in FIGURE 4 since the view is broken. Each of the pads 39 is connected to a manifold groove 80 through an aperture 76 provided by a restrictor 78. The manifold groove, in turn, is connected to the passage 68. Pressurized air is supplied by conduit 60 through conduits 62, passages 64, 66, and 68 and into the manifold groove 80. From the groove 80, the fluid is distributed to various pads 39 between the body 37 and the bore 24 of the spindle 20 through restrictors 78. The pressurized fluid supplied to the pads 39 leaks out the open ends of the spindle in a controlled manner to provide an externally pressurized fluid bearing between the gauge body 37 and the spindle bore 24. The function and operation of externally pressurized fluid bearings is well known as well as the function of the restrictors 78 in centering and controlling the externally pressurized fluid bearing thus provided.

The body element 52 is provided with a mounting pad 82 upon which is cantilevered a mounting shaft 83 through a leaf spring 84. The leaf-hand end of the leaf spring is sandwiched between the mounting pad 82 and a top block 86 secured thereto in any suitable manner such as by a screw 88. The right-hand end of the leaf spring 84 is secured to the mounting shaft 83 in the same manner.

Referring to the upper portion of FIGURE 4, the mounting shaft 83 has a slot 91 which includes follower surface 90. A cam block 92 disposed in slot 91 and threaded to the end of adjustment rod 70 engages cam follower surface 90. A rotatable crank 94 is secured to the left-hand of the rod 70. The cam block 92 is being disposed in the slot 91 translates only when the crank 94 is rotated. This function allows the mounting shaft 83 to be adjusted vertically by turning the crank 94. The probe is indicated generally at 46. It is a scissors type probe which is to say it comprises two members pivotally mounted to each other so that the measuring end is expandable. The first arm 96 of the scissors probe has a bifurcated portion 97 connected at its inboard end to the mounting shaft 83 through a flat leaf spring 98 suitably secured to both the mounting shaft 83 and the lever 96 much in the same manner that the mounting shaft 83 is secured to the body element 52. The plane of the leaf spring 98, however, is perpendicular to the plane of the leaf spring 84. The outboard or nonbifurcated end 99 of the lever 96 is provided with a measuring stylus 100.

The second lever or arm 102 of the scissors linkage is pivotally mounted to the midportion of the first arm 96. Referring to FIGURE 6, the pivotal mounting is accomplished by two flexural pivots 104 and 105. Each of the flexural pivots comprises two sleeves interconnected by cross leaf springs so that the sleeves are relatively rotatable. Relative rotation, however, deflects and loads the leaf springs so that the sleeves tend to return to their unloaded positions. The first flexural pivot 104 has one sleeve press fitted in a bore in one of the bifurcations of the arm 96 and the other sleeve press fitted in bore 107 in the second arm 102. The second flexural pivot 105 has one sleeve press fitted in the bore 107 and the other sleeve press fitted to a cam follower 101 which is pivotally mounted on the other bifurcation of arm 96 by a screw 139. The cam follower 101 contacts an adjustable cam 103 (best shown in FIGURE 5) which can be adjusted to give a predetermined amount of preload to the flexural pivot 105 and thus preload the arms 96 and 102 to a zero reference angle position. The second stylus 106 is on the outboard end of the arm or lever 102. The edges of the styli 100 and 106 act as cams to force the arms together as the arms enter the calibration ring and workpiece. The axes of flexure pivots 104 and 105 are parallel to the axis of the pivotal flexure provided by leaf spring 98. The inboard end of the arm 102 carries a core 108 which is reciprocable within an annular coil 110 provided in the first scissors arm 96, see FIGURE 5. Electrical power is supplied to the coil 110 through conductors 112 disposed within the shell 54. The conductors 112 extend back through the body element 52, shell 51, and out through the boss 58, see FIGURE 4. Thus the position of the core 108 in the annular coil 110 is determined by the angular relationship of the arms 96 and 102 and this position will produce a signal which is indicative of the angular position of the arms or the diameter of the hole in the workpiece 32 being gauged. Also in relation to FIGURE 4, a coolant conduit 114 is connected to conduit 116 which lies adjacent the shell 51 and communicates with a passage 118 in the body element 52. The passage 118 is interrupted by an access opening 120 in the body element 52. The opening 120 permits mounting of the shaft 83 to the body element 52. The passage 118 continues on the other side of the access opening 120 and it is spanned by a flexible conduit 152 after mounting the shaft 83 to the body element 52. Referring now to the upper portion of FIGURE 4, the passage 118 continues to the end of the body element 52 where it communicates with a tubular conduit 120 which extends the length of the shell 54 and terminates in a passage or nozzle 122 in the end plate of the shell 54. The passage thus described is adapted to receive a cooling or working lubricant from conduit 114 and to direct it through nozzle 122 toward the styli 100–106 or workpiece 38.

Figure 7:
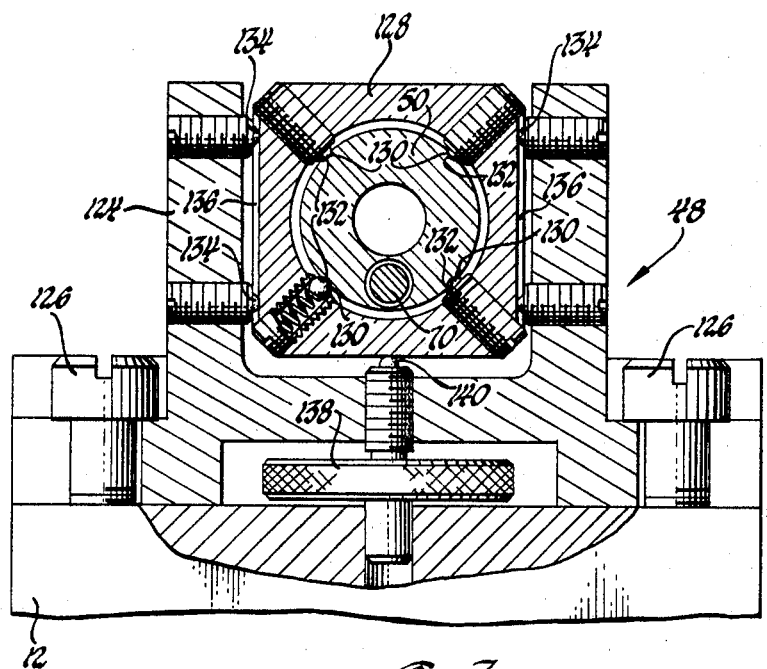
FIGURE 7 is a view taken along the line 7—7 of FIGURE 4 and looking in the direction of the arrows.

Referring now to FIGURE 7, the detail of the mount 48 which secures the gauge 36 to the bed 12 is shown. The mount 48 includes a U-shaped bracket 124 bolted to the bed 12 at 126. A collar 128 surrounds the end shell 50 of the gauge 36 and lies between the two upright legs of the U-shaped bracket 124. Four equally circumferentially spaced, adjustable spring load balls 130 mounted on the collar ride in axial grooves 132 in gauge shell 50 to permit the gauge to translate but not rotate. Two vertically spaced adjustable spring loaded balls 134 are provided in each arm of the U-shaped bracket 124. The balls 134 ride in vertical grooves 136 in the outer vertical surfaces of the collar 128 so that the collar 128 and gauge 37 are vertically adjustable at the mount 48. Vertical adjustment is accomplished by wheel 138 and a fifth spring load ball screw 140 in the bracket 124 which contacts the under surface of collar 128 to achieve fine alignment with the headstock spindle bore.

We claim:
1. In apparatus for removing material from a workpiece and for periodically measuring the workpiece during the material-removal process comprising, in combination:
   a support having a rotatable spindle mounted thereon with said spindle being translatable relative to said support between working and nonworking positions,
   a bore in said spindle,
   a calibration ring mounted on said spindle concentric with said bore,
   a workpiece mounted on said spindle adjacent one end thereof, said workpiece being outboard of and in axial alignment with said calibration ring,
   a gauge including an elongated cylindrical body of slightly smaller diameter than said bore disposed in said bore with an annular space therebetween, passage means in said body opening into said annular space, conduit means connected to said passage means and a source of pressurized fluid, an externally pressurized fluid bearing comprising said passage means, said conduit means and said source, and said body supported in said bore by said externally pressurized fluid bearing, a portion of said elongated cylindrical body extending out of the opposite end of said spindle, means to nonrotatably mount said portion of said body extending out of said spindle on said support,
   said gauge further including a shaft mounted longitudinally of said body by a flexural pivot in said body about a first axis perpendicular to the longitudinal axis of said body, cam means in said body adjustable from outside of said spindle and said body, said cam means engaging said shaft to pivot said shaft about the first axis and thereby position said shaft centrally of said body,
   said gauge further including a single expandable probe means comprising a first arm mounted by a flexural pivot on said shaft about a second axis mutually perpendicular to said first axis and said longitudinal axis, said arm having a first stylus to contact the calibration ring and workpiece, and a second arm pivotally mounted on said first arm about an axis parallel to said second axis, said second arm having a second stylus in opposed relation to said first stylus to contact the calibration ring and workpiece, said gauge being positioned on said support and said probe means being positioned in said gauge so that said workpiece and said calibration member are sequentially traversed by said styli during the translational movement of said spindle between said positions whereby the profile of said workpiece can be traced and its size compared to said calibration member without said workpiece being removed from said apparatus and means to detect relative motion of said styli.

References Cited
UNITED STATES PATENTS

| | | | |
|---|---|---|---|
| 3,069,780 | 12/1962 | Miller et al. | 33—185 |
| 2,818,687 | 1/1958 | Quimby | 51—95 |
| 2,590,151 | 3/1952 | Bryant et al. | 51—165.20 |
| 2,901,830 | 9/1959 | Poole. | |
| 2,439,595 | 4/1948 | Cooke. | |
| 2,309,891 | 2/1943 | Fisk. | |
| 2,864,171 | 12/1958 | Edling et al. | |

LEONARD FORMAN, Primary Examiner

S. L. STEPHAN, Assistant Examiner

U.S. Cl. X.R.

33—143, 149, 178; 51—165